United States Patent [19]

Shippy

[11] Patent Number: 4,748,571

[45] Date of Patent: May 31, 1988

[54] LINE-UP VISION SYSTEM

[75] Inventor: Jack A. Shippy, Pomona, Calif.

[73] Assignee: FMC Corporation, Chicago, Ill.

[21] Appl. No.: 4,947

[22] Filed: Jan. 20, 1987

[51] Int. Cl.$^4$ .............................................. G06F 15/00
[52] U.S. Cl. .................................... 364/513; 364/571;
358/101; 356/399
[58] Field of Search ............... 364/513, 474, 475, 571;
250/561, 571; 356/399–401, 138, 132; 358/101;
382/8, 67

[56] References Cited

U.S. PATENT DOCUMENTS

| | | | |
|---|---|---|---|
| 4,105,925 | 8/1978 | Rossol et al. | 250/561 |
| 4,486,842 | 12/1984 | Herman | 364/513 |
| 4,493,420 | 1/1985 | Dennis | 209/587 |
| 4,613,269 | 9/1986 | Wilder et al. | 364/513 |
| 4,628,464 | 12/1986 | McConnell | 364/513 |

Primary Examiner—Charles E. Atkinson
Assistant Examiner—Allen MacDonald
Attorney, Agent, or Firm—L. B. Guernsey; H. M. Stanley; R. B. Megley

[57] ABSTRACT

A line-up vision system for testing the alignment of a workpiece in a holder of an automated machining apparatus. A light source illuminates one portion of the workpiece and keeps another portion of the workpiece dark. A light colored backdrop provides a sharp edge along the dark portion of the workpiece for a camera directed toward the backdrop. As the workpiece is rotated slowly the camera observes any movement of the sharp edge to determine if the workpiece is properly positioned in the holder of the machining apparatus. If the workpiece is properly positioned the camera provides signals which cause the apparatus to proceed with machining operations on the workpiece.

6 Claims, 6 Drawing Sheets

FIG_1

FIG_4A

FIG_4B

FIG_5

FIG_6

FIG_7

FIG_8

FIG_9

FIG_10

LINE-UP VISION SYSTEM

BACKGROUND OF THE INVENTION

The present application pertains to a system for aligning a workpiece in a flexible machining system, and more particularly to a vision system for aligning a workpiece in a machine without the use of a touch probe.

Robots are used for an increasing number of tasks, including the loading of workpieces in numerically controlled turning centers and other machining systems. One of the problems associated with robot loading of workpieces or parts is the proper alignment of the part in the machining system. Touch probes have been used to provide informational feedback which tells if the workpiece has been correctly placed into a set of jaws. However, in many machine turrets equipped with conventional tool holders a probe cannot touch both sides of a part, nor can they orient the part to the machine while sequentially probing. The part can be centered in the plane where it is being probed and be off center in other parallel planes.

SUMMARY OF THE INVENTION

The present invention comprises a line-up system for use with automated machining apparatus to test for part alignment in the apparatus using noncontacting sensing of the part. A light source is mounted for illuminating a portion of the part to be aligned and for keeping another portion of the part relatively dark. A camera is mounted for viewing the part to be aligned with the camera viewing an edge between the illuminated area and the dark area and with the camera providing a signal which indicates the position of the edge. The machining apparatus is actuated to slowly rotate the part so the camera can observe the location of the edge as the part rotates and means are provided for comparing the position of the edge relative to a predetermined position as the part is rotated.

BRIEF DESCRIPTION OF THE DRAWINGS

FIGS. 4A-10 are flow charts illustrating operation of the line-up vision system of the present invention.

DESCRIPTION OF THE PREFERRED EMBODIMENT

Figure 1:
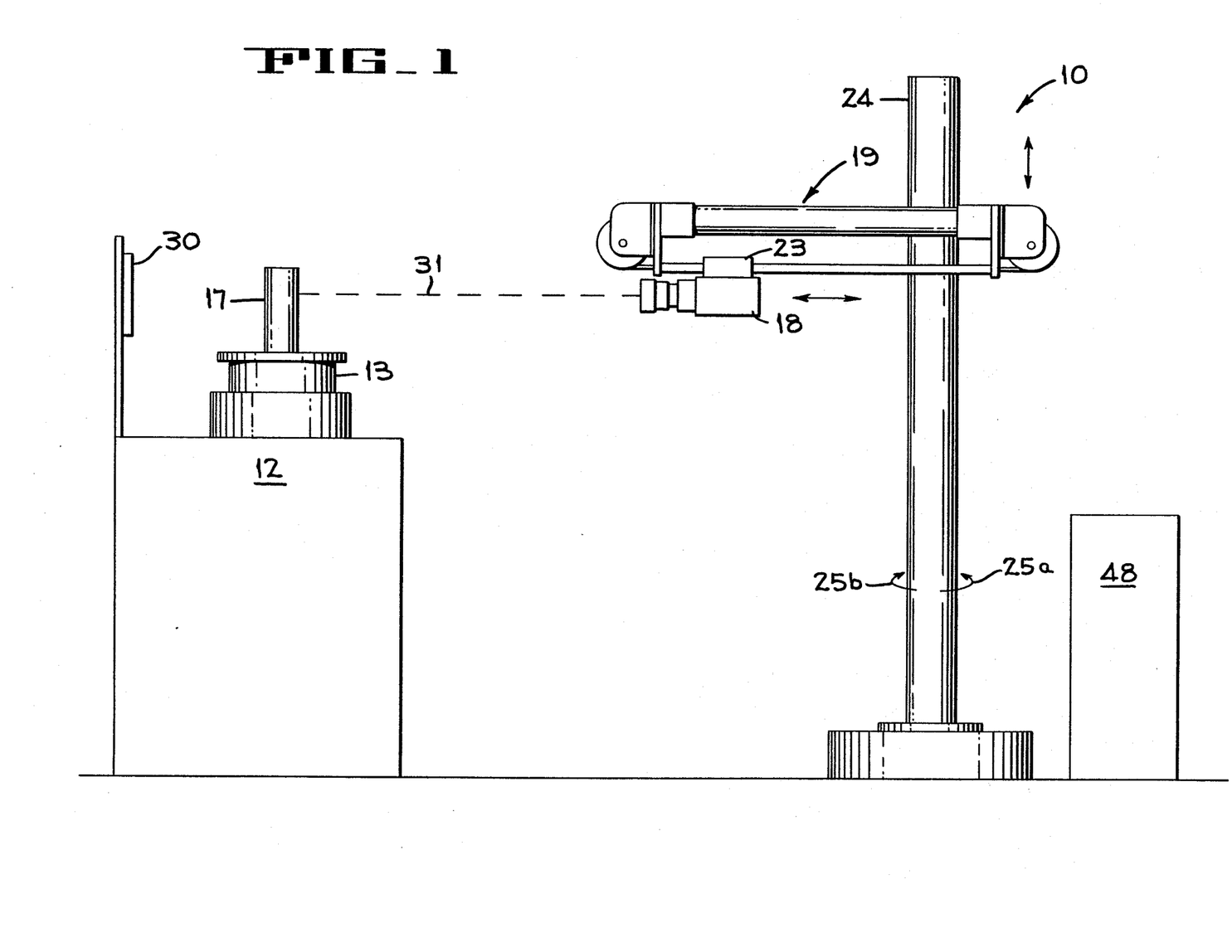
FIG. 1 is a side elevation of a line-up vision system of the present invention for testing the alignment of a part in a machining apparatus.
Figure 2:
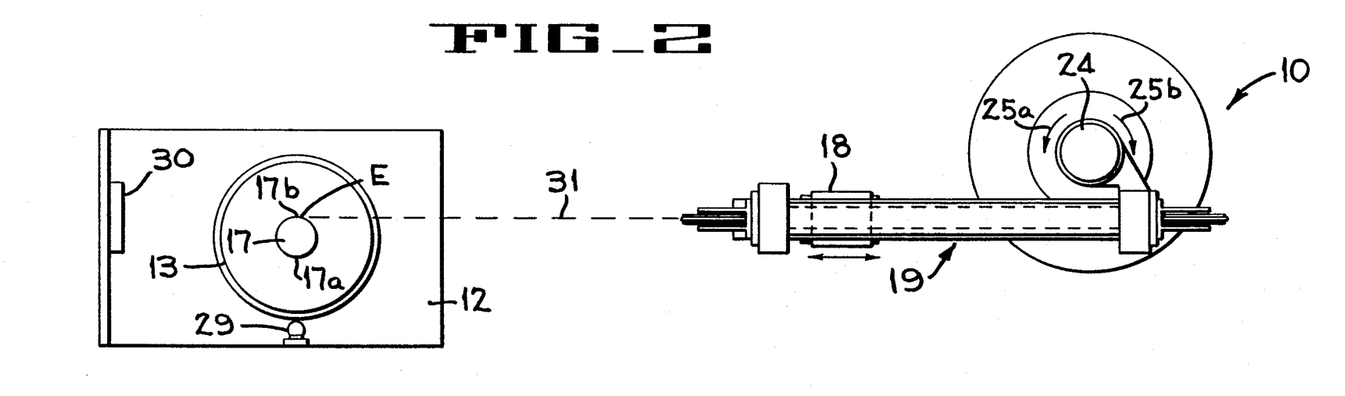
FIG. 2 is a plan view of the line-up vision system of FIG. 1.

A portion of a flexible machining apparatus 10 in which a line-up vision system 11 of the present invention can be used is disclosed in FIGS. 1 and 2. The apparatus includes a lathe 12 having a rotatable chuck 13 for holding a part or workpiece 17 extending vertically from the chuck 13. A camera 18 aimed toward part 17 is movably mounted on a robot 19. The camera can be moved back and forth relative to part 17 by a carriage 23 of the robot; can be moved up and down on a vertical post 24 and post 24 can be rotated as shown by a pair of arrows 25a, 25b to orient the camera relative to the part 17. A lamp 29 illuminates a portion 17a nearest the lamp 29 and leaves a relatively dark portion 17b on the side of the part away from lamp 29. A backdrop 30 of light colored material such as acetal, enables the camera to observe an edge E along the dark portion 17b of the part 17. When part 17 is rotated slowly by lathe 13 camera 18 observes any change in the location of edge E relative to a center line of vision 31.

When a symmetrical part 17, such as a cylinder, is mounted properly in chuck 13 the sharp edge E remains aligned with line 31 (FIG. 2) as part 17 is rotated. When the symmetrical part 17 is not centered in chuck 13 the edge E moves relative to line 31 causing the camera to provide a signal which indicates that part 17 is not properly centered in chuck 13. For example, improperly positioning of the part by robot 19 or the presence of metal chips between chuck 13 and part 17 can cause incorrect centering of the part. The machining apparatus can be programmed to reposition the part 17 and/or provide a warning signal to allow a human operator to correct a problem which causes incorrect centering of part 17.

The line-up vision system 11 (FIG. 3) includes a camera 18 such as the Honeywell HDS-232 made by Honeywell Visitronic, Englewood, Colo. The HDS-232 includes a plurality of pixels or photo-sensitive cells (not shown) arranged in a matrix inside camera 18. The individual pixels provide output signals determined by the location of the dark edge E of part 17 relative to line 31 through the center of camera 18. Camera 18 (FIG. 3) includes a microprocessor 35 and a read-only-memory (ROM) 36 having a program which uses pixel output signals to detect the location of edge E of part 17. Camera 18 develops a signal in ASCII code which gives location of edge E as observed by camera 18.

Figure 3:
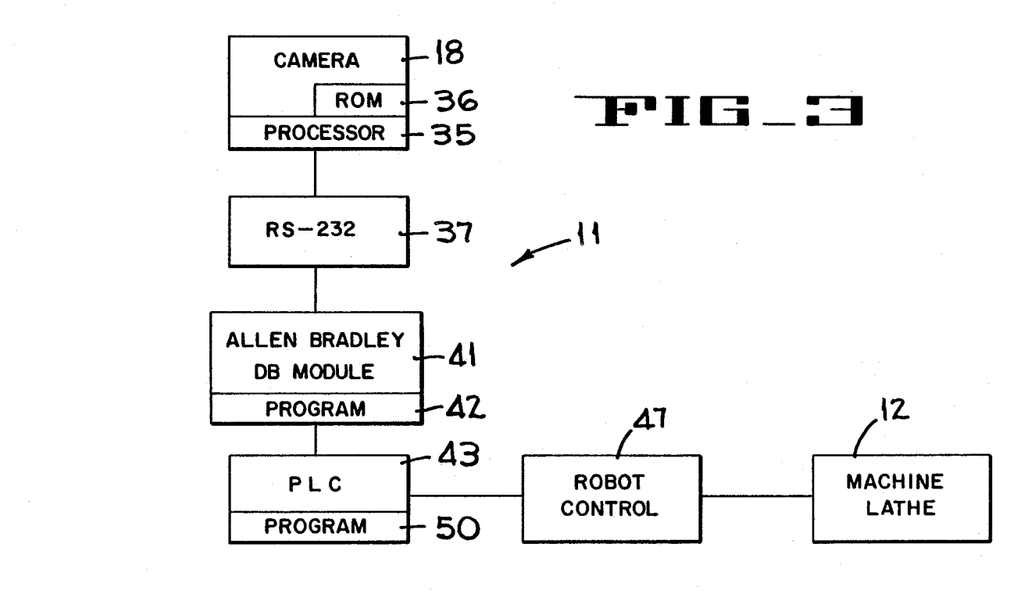
FIG. 3 is a block diagram of a control system for checking alignment of parts being loaded into a flexible machining system.

The signal from camera 18 is transferred by an interface 37, such as an RS-232 link to a basic module 41 having a program portion 42. The program portion 42 executes a continuous program that waits for a data transfer signal from a programmable logic controller (PLC) 43. The program then transfers data from camera 18 and processes the camera data. Interface signals are transferred between PLC 43 and basic module 41, and between PLC 43 and a robot control 47 and machine lathe 12. PLC 42 includes a program portion 50 which provides signals to module 41, control 47 and lathe 12. A basic module 41 which can be used in the present invention is the 1771-DB basic module made by Allen-Bradley, Systems Division, Highland Heights, Ohio. A programmable logic controller 42 which can be used is the Mini PLC-2/15 also made by Allen-Bradley. The PLC program receives signals from robot control 47 and lathe 12 through PLC 42 and communicates with the module 41 through block transfer of data. Robot control 47 operates the robot 19 and lathe 12 or other type of machine. Robot 19 may have equipment (not shown) for transferring parts 17 from a conveyor 48 (FIG. 1) to chuck 13 of lathe 12. A computer program written in "Basic" language for operating camera 18 and communicating with PLC 43 is as follows:

from camera 18 and processes the camera data. Interface signals are transferred between PLC 43 and basic module 41, and between PLC 43 and a robot control 47 and machine lathe 12. PLC 42 includes a program portion 50 which provides signals to module 41, control 47 and lathe 12. A basic module 41 which can be used in the present invention is the 1771-DB basic module made by Allen-Bradley, Systems Division, Highland Heights, Ohio. A programmable logic controller 42 which can be used is the Mini PLC-2/15 also made by Allen-Bradley. The PLC program receives signals from robot control 47 and lathe 12 through PLC 42 and communicates with the module 41 through block transfer of data. Robot control 47 operates the robot 19 and lathe 12 or other type of machine. Robot 19 may have equipment (not shown) for transferring parts 17 from a conveyor 48 (Fig. 1) to chuck 13 of lathe 12. A computer program written in "Basic" language for operating camera 18 and communicating with PLC 43 is as follows:

PRODUCTION DB MODULE PROGRAM FOR HDS-232 CAMERA
REV. 2 DATED 5-30-86.
STORAGE: DB MODULE EPROM AT ASSET NO. 791; ROM7

```
10      REM BASIC MODULE CAMERA PROGRAM
20      DIM A(10),B(12),C(250)
30      REM SET-UP PERIPHERAL PORT
50      REM SET-UP PERIPHERAL PORT
60      PUSH 7
70      PUSH 2
80      PUSH 1
90      PUSH 0
100     PUSH 0
110     CALL 30
```

```
115   CALL 9 :  REM ENABLE INTERRUPTS AND I/O PORT
120   CALL 9 :  REM ENABLE PR PORT
130   FOR I=1 TO 256 :  CALL 35 :  POP X :  NEXT I
140   PRINT #CHR(13)
150   FOR I=1 TO 200 :  CALL 35 :  POP C(I)
160   NEXT I
170   M=0
180   PRINT #"ZN"
190   CALL 35
200   PRINT #"L",CHR(13)
210   FOR I=1 TO 199 :  CALL 35 :  POP C(I) :
      IF C(I)=76 THEN N=I
215   NEXT I
220   IF C(N)<>76 THEN 4000
230   PUSH 1 :  PUSH 1 :  CALL 21 :  CALL 7
250   PUSH 1 :  CALL 5 :  REM SET 1 WORD BTR FROM DB
      MODULE
260   PUSH 1 :  CALL 4 :  REM SET 1 WORD BTW TO DB
      MODULE
261   J=0 :  D=0 :  K=0 :  E=0 :  Z=5 :  TIME=0 :
      CLOCK O
262   CALL 6 :  REM BLOCK TRANSFER WRITE FROM PLC
265   PUSH 1 :  REM CONVERT 1ST WORD OF PLC DATA
272   CALL 11 :  REM CONVERT BINARY TO FP
280   POP D :  REM STORE CONVERTED BINARY DATA AT
      VARIABLE D
290   IF D=6 THEN X=76
300   IF D=7 THEN X=82
310   IF D>4 THEN K=1 :  TIME=0 :  CLOCK 1
320   IF TIME>3000 THEN GO TO 4040
323   IF D>4 THEN GO TO 328
325   IF K=0 THEN GO TO 262
326   IF K=1 THEN GO TO 500
328   IF J=0 THEN GO SUB 1000
330   IF E>6 THEN GO TO 4010
```

```
340    FOR I=1 TO 12
345    CALL 35
350    POP Y
355    B(I)=Y-48
370    NEXT I
371    FOR I=1 TO 20 :  CALL 35 :  POP U :   NEXT I
380    PRINT #CHR(X),CHR(13) :   REM ASK FOR EDGE DATA
382    TIME=0 :  CLOCK 1 :  DO :   UNTIL TIME >.015 :
       CLOCK 0
385    FOR I=1 TO 12 :  IF B(I)=-2 THEN N=I
386    NEXT I
387    IF N=0 THEN 4040
388    IF B(N-2)=-4 THEN B(N-2)=0
390    C(J)=10*B(N-2)+B(N-1)+B(N+1)/10+B(N+2)/100
395    IF C(J) >23 THEN GO TO 398
396    IF C(J)<0 THEN GO TO 398
397    GO TO 400
398    FOR M=1 TO 12 :  IF B(M)=30 THEN E=E+1 :
       N=M
399    NEXT M :  GO TO 410
400    J=J+1 :   GO TO 262
410    IF B(N)=30 THEN 480 ELSE 4010
480    IF B(N-2)=-4 THEN GO TO 262
495    GO TO 4010
500    J=J-1 :  IF J<9 THEN GO TO 4010 :  REM CLEAR
       LAST ENTRY
501    CLOCK 0
520    REM CLEAR INPUT BUFFER
530    FOR I=1 TO 34 :   CALL 35
540    POP X :   NEXT I
550    S=23 :  L=0 :  T=0 :   REM CALCULATE RUNOUT FOR
       VALUES
       BETWEEN 0 & 23
560    FOR I=1 TO J :  T=T+C(I) :   NEXT I
570    G=T/J :  T=0 :  REM GET AVERAGE VALUE
```

```
580    FOR I=1 TO J : T=T+(C(I)-G)**2 : NEXT I
590    F=(T/(J-1))**.5 : REM GET STANDARD DEVIATION
600    FOR I=1 TO J
605    N=0
610    H=ABS(C(I)-G) : IF H>F THEN N=N+1
630    IF N>4 THEN 650
640    IF H<F THEN N=0
645    NEXT I
646    GO TO 710
650    IF C(I)<S THEN S=C(I) ELSE IF C(I)>L
       THEN L=C(I)
660    IF C(I-1)<S THEN S=C(I-1) ELSE IF C(I-1)>L
       THEN L=C(I-1)
670    IF C(I-2)<S THEN S=C(I-2) ELSE IF C(I-2)>L
       THEN L=C(I-2)
680    IF C(I-3)<S THEN S=C(I-3) ELSE IF C(I-3)>L
       THEN L=C(I-3)
690    IF C(I-4)<S THEN S=C(I-4) ELSE IF C(I-4)>L
       THEN L=C(I-4)
700    I=I+1 : GO TO 600
710    IF L-S>(2*F) THEN Q=L-S ELSE Q=2*F
720    IF Q/2>.5 THEN D=3 : GO TO 900
730    D=7
900    PUSH D : PUSH 1 : CALL 21
910    CALL 7 : REM SEND LINE-UP INFO TO READ BUFFER
       FOR PLC
920    GO TO 261
1000   REM TIME DELAY
1020   J=J+1
1030   PRINT #CHR(X),CHR(13) : REM ASK FOR EDGE DATA
1034   TIME=0
1035   CLOCK 0
1040   CLOCK 1
1045   DO
1050   UNTIL TIME>1.0
```

```
1060    CLOCK 0
1070    RETURN
4000    REM RESTART ROUTINE FOR IMPROPER STARTUP
4005    PUSH 10 : PUSH 1 : CALL 21 : CALL 7 :
        REM BTR CAMERA FAILED TO START
4006    IF M>5 THEN 5000
4009    M=M+1 : GO TO 200
4010    GO SUB 6000
4015    PUSH 9 : PUSH 1 : CALL 21 : CALL 7
4016    FOR I=1 TO 50 : CALL 35 : POP X : NEXT I
4017    GO TO 261
4040    GO SUB 6000
4042    D=9 : PUSH D : PUSH 1 : CALL 21
4045    CALL 7 : REM DATA ERROR
4046    FOR I=1 TO 50 : CALL 35 : POP X : NEXT I
4047    GO TO 261
5000    PUSH 0 : PUSH 1 : CALL 21 : CALL 7
5010    END
6000    CALL 6 : PUSH 1 : CALL 11 : POP Z
6005    TIME=0 : CLOCK 1 : DO : UNTIL TIME >.040 :
        CLOCK 0
6010    IF Z<4 GO TO 6020 ELSE 6000
6020    RETURN
```

The PLC program which sets up block transfer with basic module 41 when camera operation is required is as follows:

MOTCH CAMERA PORTION OF
LADDER DIAGRAM DUMP

REV 3
5-27-86

```
+-----------------------------------------------(CTR)-+
!                                                    !
!                                        PR 000      !
!                                        AC 000      !
!                                                    !
! 032                                       132      !
+-[G]-------------------------------------------(PUT)-+
! 000                                       000      !
!11411                                    05001      !
+-] [-------------------------------------------( )--+
!                                                    !
!11412                                    05000      !
+-] [-------------------------------------------( )--+
!                                                    !
!                                         05003      !
+-----------------------------------------------(U)--+
!                                                    !
!                                         05004      !
+-----------------------------------------------(U)--+
!                                                    !
!                                         05005      !
+-----------------------------------------------(U)--+
!                                                    !
!                                         05006      !
+-----------------------------------------------(U)--+
!                                                    !
!                                         05007      !
+-----------------------------------------------(U)--+
!                                                    !
!                                         05010      !
+-----------------------------------------------(U)--+
!                                                    !
!                                         05011      !
+-----------------------------------------------(U)--+
!                                                    !
```

```
           !                                        05012   !
           +----------------------------------------(U)--+
           !                                            !
           !                                        05013   !
           +----------------------------------------(U)--+
           !                                            !
           !                                        05014   !
           +----------------------------------------(U)--+
           !                                            !
           !                                        05015   !
           +----------------------------------------(U)--+
           !                                            !
           !                                        05016   !
           +----------------------------------------(U)--+
           !                                            !
           !                                        05017   !
           +----------------------------------------(U)--+
           !                                            !
           !                                        05400   !
           +----------------------------------------( )--+
           !                                            !
           !11410 11411                             12001   !
           +-] [---]/[------------------------------(U)--+
           !                                            !
           !11410 11411                             12001   !
           +-]/[---] [------------------------------(U)--+
           !                                          ON  !
           ! 0500   054    004                      12000   !
           +-[B]---[L]---    -----------------------(U)--+
           ! 003         001                            !
           !11410 11411                             05412   !
           +-] [---] [------------------------------(U)--+
           !                                            !
           !11410 12001                             12000   !
           +-] [---] [------------------------------(L)--+
```

```
       :                                                        OFF   :
       !05002 11706                                            05412  :
       +-]/[---] [-----------------------------------------------(L)--+
       :                                                         ON   :
       !11410                                                   05002 :
       +-] [-----------------------------------------------------( )--+
       :                                                               :
       :                                                         01700 :
       +---------------------------------------------------------( )--+
       :                                                               :
       !12000 01707  030   130                                  01706  :
       +-] [---]/[---[G]---[G]-----------------------------------( )--+
       :             170   050                                         :
       !12003                                                   01314  :
       +-] [-----------------------------------------------------(U)--+
       :                                                               :
       !12003                                                   01315  :
       +-] [-----------------------------------------------------(U)--+
       :                                                               :
       !12003                                                   01316  :
       +-] [-----------------------------------------------------(U)--+
       :                                                               :
       !12003                                                   01317  :
       +-] [-----------------------------------------------------(U)--+
       :                                                               :
       !01706                                                   01701  :
       +-]/[-----------------------------------------------------( )--+
       :                                                               :
       !01706 11707 16210   031    131                          01707  :
       +-]/[---]/[---]/[---[G]---[G]-----------------------------( )--+
       :                    170    052                                 :
       !11707                                                   12003  :
       +-] [-----------------------------------------------------(L)--+
       :                                                         ON    :
       !11707  052   053                                        16213  :
```

```
+-] [---[G]---[=]-------------------------------(U)--+
!      001   000                                    :
!01314 01315 01316 01317                     12002  :
+-]/[---]/[---]/[---]/[--------------------------(U)--+
!                                                   :
!12002 01314                                  05300 :
+-] [---] [--------------------------------------( )--+
!                                                   :
!12002 01315                                  05301 :
+-] [---] [--------------------------------------( )--+
!                                                   :
!12002 01316                                  05302 :
+-] [---] [--------------------------------------( )--+
!                                                   :
!12002 01317                                  05303 :
+-] [---] [--------------------------------------( )--+
!                                                   :
!05200 12002                                  01314 :
+-] [---]/[--------------------------------------(L)--+
!                                                ON  :
!05201 12002                                  01315 :
+-] [---]/[--------------------------------------(L)--+
!                                               OFF  :
!05202 12002                                  01316 :
+-] [---]/[--------------------------------------(L)--+
!                                               OFF  :
!05203 12002                                  01317 :
+-] [---]/[--------------------------------------(L)--+
!                                               OFF  :
!01314                                        16304 :
+-] [--------------------------------------------(U)--+
!                                                   :
!01314 01315                                  16304 :
+-]/[---] [--------------------------------------(L)--+
!                                               OFF  :
```

```
!01314 01315 01316                                       16304  !
+-] [---] [---]/[---------------------------------(L)--+
!                                                       OFF    !
!01314                                                   16304  !
+-]/[-----------------------------------------------(L)--+
!                                                       OFF    !
!01314 01315 01316 01317                                 16304  !
+-] [---]/[---]/[---] [---------------------------(L)--+
!                                                       OFF    !
!01314 01315 01316                                       16304  !
+-] [---] [---] [---------------------------------(U)--+
!                                                              !
!
!
+ END 00246
!
```

Figure 4A:
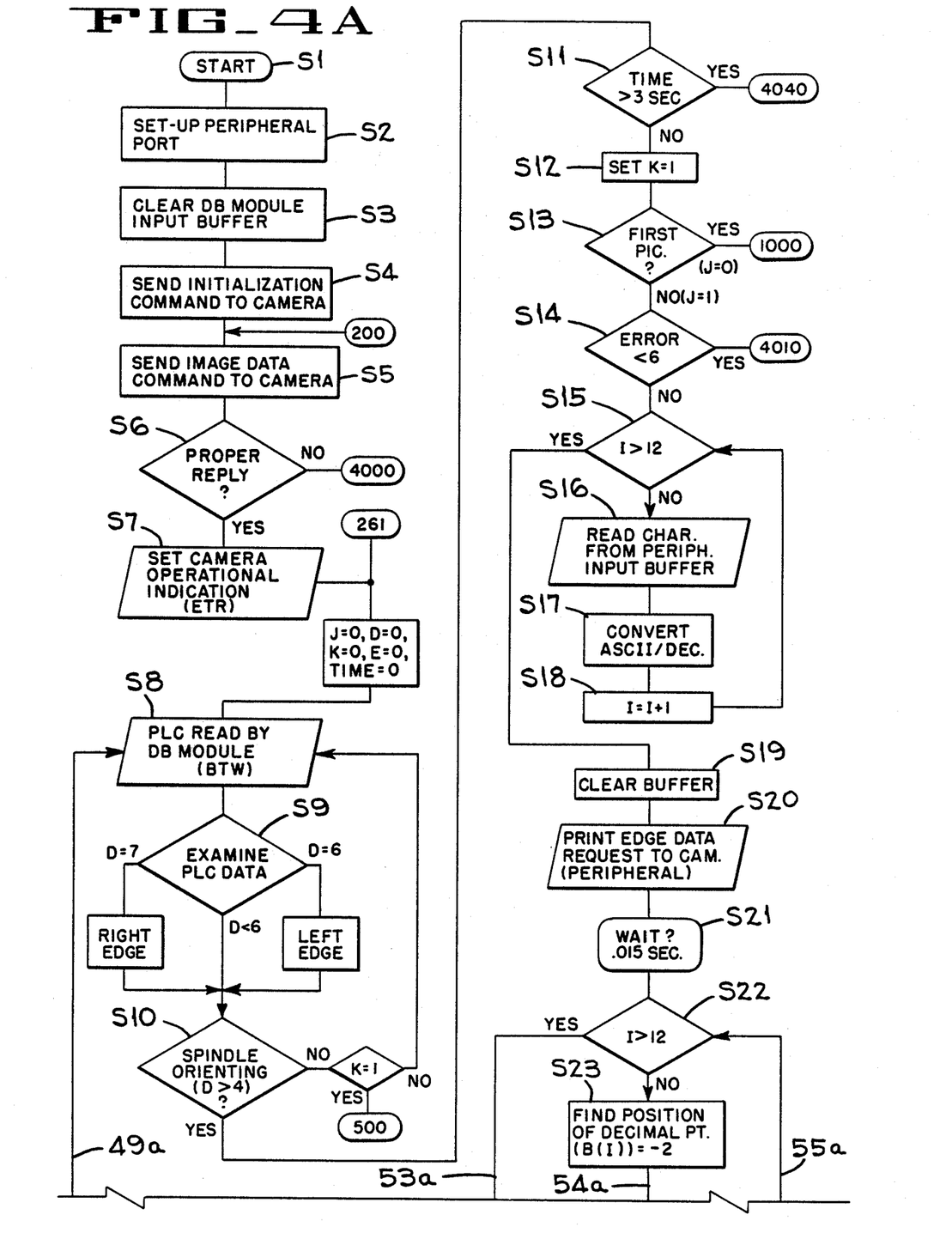
Figure 4B:
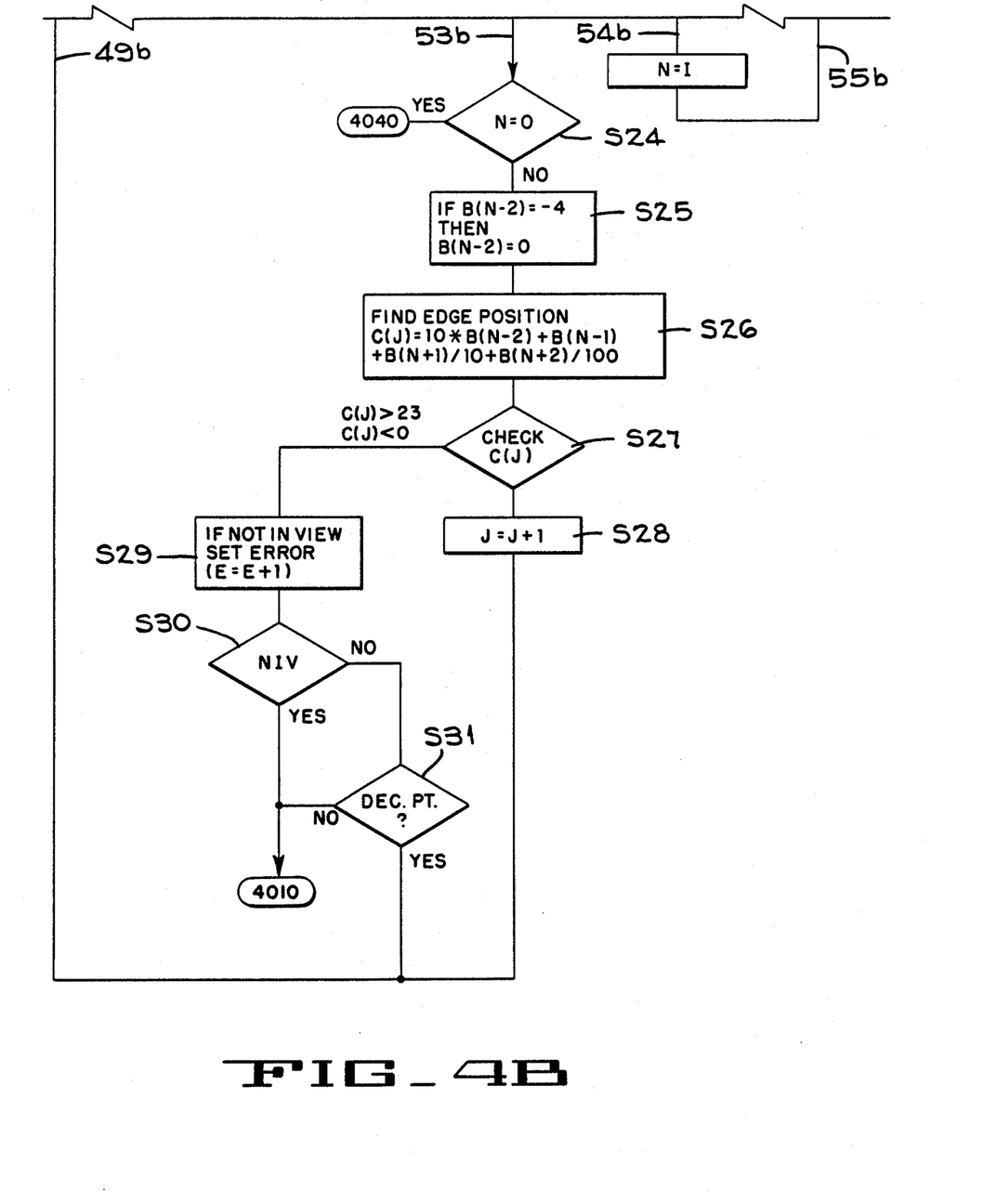

Details of the operation of the camera and associated equipment is also disclosed in the flow charts of Figures 4A – 10. Figures 4A, 4B comprise a flow chart which discloses the operation of the camera 18 and the associated apparatus of Figure 3. The drawings of Figures 4A, 4B should be placed side-by-side with line 49a of Figure 4A connected to line 49b of Figure 4B and lines 53a – 55a of Figure 4A connected to corresponding lines 53b – 55b of Figure 4B. The steps S1 – S6 (Fig. 4A) initialize and check operation of camera 18, modules 37, 41 and PLC 42. If the systems operates properly the program proceeds to step S7; and if the system is not properly initialized the program jumps to step 4000 of Figure 7 where program restart is tried. If the program restarts properly (Fig. 7) in five tries or less, the program resumes operation at step S5 (Fig. 4A). If the program cannot be started the equipment is shut down.

During program operation edge E (Fig. 2) is

Details of the operation of the camera and associated equipment is also disclosed in the flow charts of FIGS. 4A–10. FIGS. 4A, 4B comprise a flow chart which discloses the operation of the camera 18 and the associated apparatus of FIG. 3. The drawings of FIGS. 4A, 4B should be placed side-by-side with line 49a of FIG. 4A connected to line 49b of FIG. 4B and lines 53a–55a of FIG. 4A connected to corresponding lines 53b–55b of FIG. 4B. The steps S1–S6 (FIG. 4A) initialize and check operation of camera 18, modules 37, 41 and PLC 42. If the systems operates properly the program proceeds to step S7; and if the system is not properly initialized the program jumps to step 4000 of FIG. 7 where program restart is tried. If the program restarts properly (FIG. 7) in five tries or less, the program resumes operation at step S5 (FIG. 4A). If the program cannot be started the equipment is shut down.

During program operation edge E (FIG. 2) is observed by camera 18 while the chuck 13 rotates slowly (step S10, FIG. 4A) and twelve characters (steps S15–S20) which indicate edge position are read from camera 18 and converted from ASCII code into decimal code for use by PLC 42.

The first portion of the program of FIG. 4A (flow chart steps S1 to S7) sets up camera 18 and checks camera operation. If camera operation and operating procedures are correct instructions are transferred from PLC 42 to module 41 and examined in steps S8, S9. As part 17 is being oriented in chuck 13 data is read from the camera and converted from ASCII into decimal values (step S17) until a total of twelve characters have been received by PLC 42. The characters are transferred into a decimal expression in step S26 (FIG. 4B) and the validity of the decimal expression is checked in step S27. When part 17 is no longer being oriented in chuck 13 the computer program transfers into the routine of FIG. 5 following step S10 (FIG. 4A).

Figure 5:
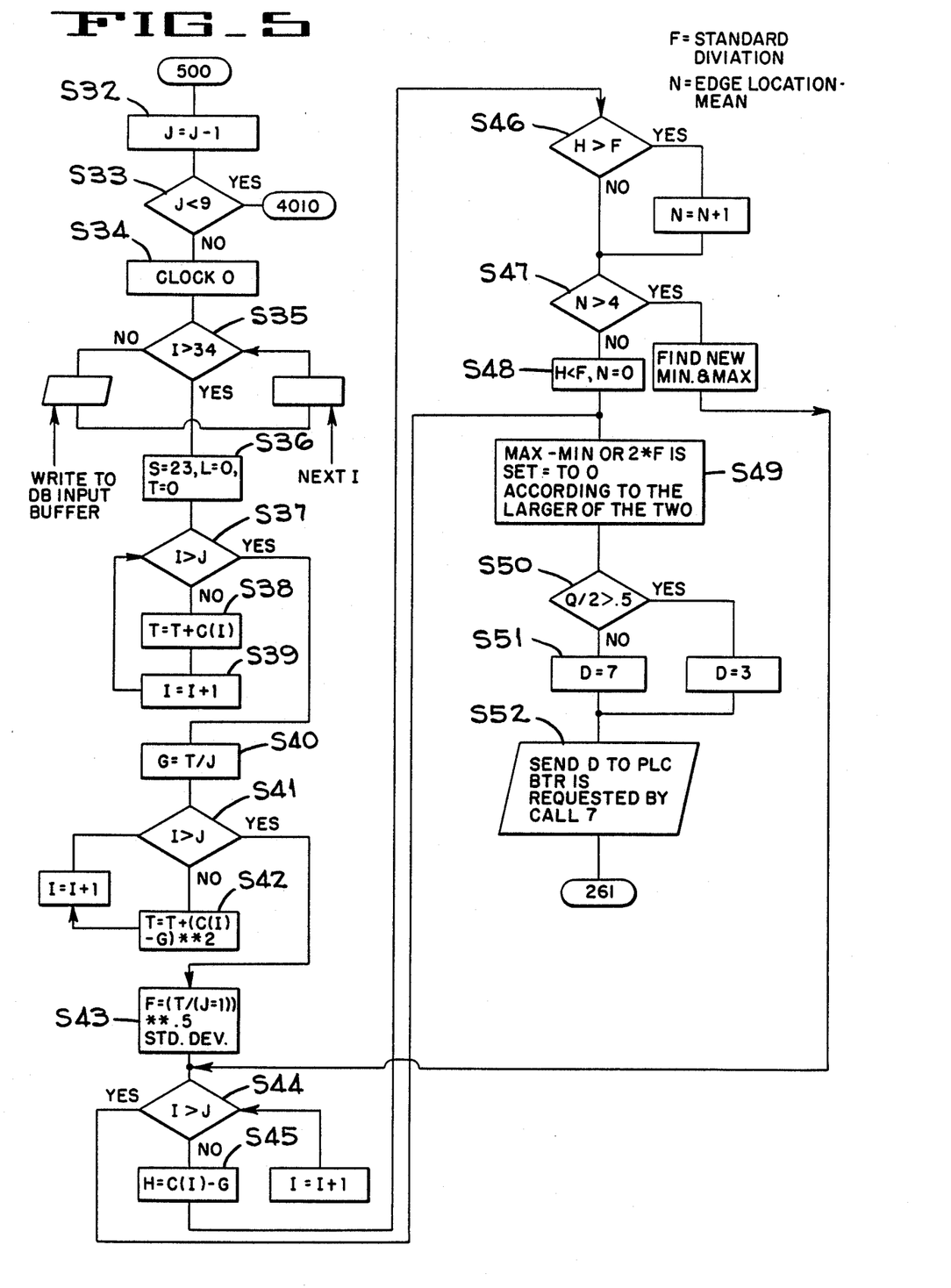
Figures 6, 7:
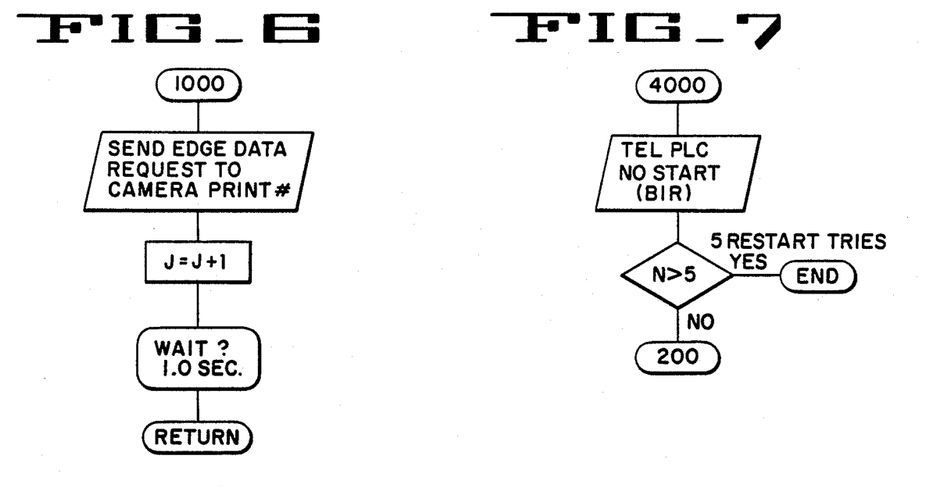
Figure 8:
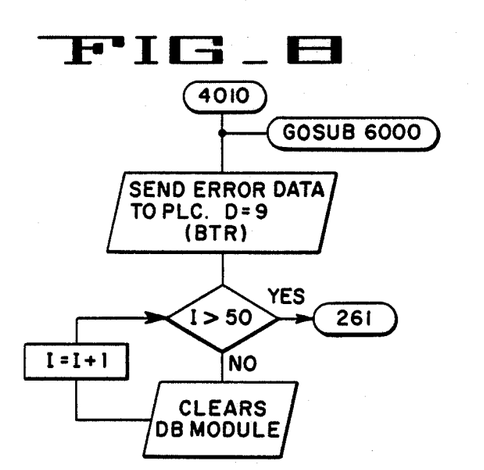
Figure 9:
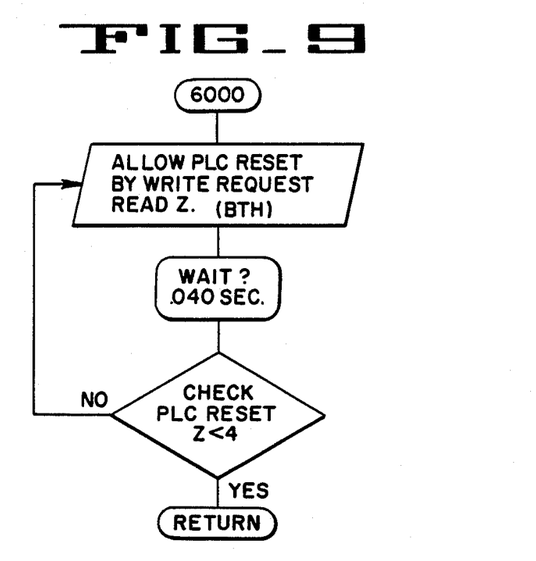

In routine 500, step S33 (FIG. 5), PLC 42 (FIG. 3) checks to make sure that at least nine pictures of part 17 (FIG. 1) have been taken from camera 18. If less than nine pictures have been taken, in step S33 PLC 42 switches to error routine 4010 (FIG. 8). When at least nine pictures have been received from camera 18, the edge location values are averaged in step S40 (FIG. 5). In step S43 a standard deviation of the edge values is calculated and in step S46 (FIG. 5) the edge location values are checked against the standard deviation. If an irregularity in the surface of part 17 (FIG. 1), or other problem should cause large variations in edge values these values are discarded and corrective measures are taken.

Figure 10:
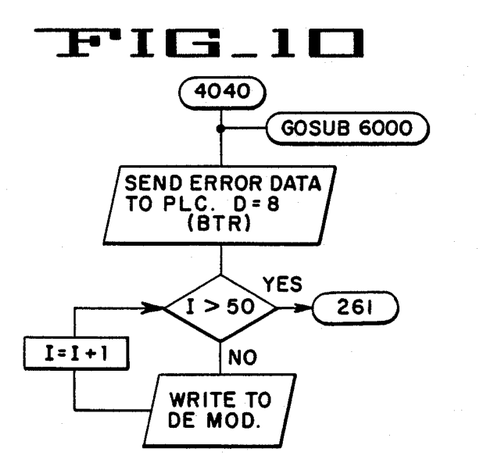

If an incorrect procedure is detected during the time data (step S11) is read from camera 18, PLC 42 switches to an error routine 4040 as shown in FIG. 10. If incorrect or inconsistent data is detected at step S14 (FIG. 4A), PLC 42 switches to error routine 4010 which is shown in FIG. 8.

If the decimal expression of step S26 (FIG. 4B) is incorrect the program checks to see if the part 17 is not in view (NIV) due to an object being positioned between the part and the camera, or due to improper orientation of the camera, etc. If it is determined that the part is not in view the program jumps to error routine 4010 of FIG. 8.

The present invention uses noncontact sensing of alignment of a workpiece in a machining apparatus by using a camera to viewing the edge of the workpiece as the workpiece is rotated. The location of the workpiece edge is compared to a predetermined location as the workpiece rotates to determine if the workpiece is properly positioned in the machining apparatus.

Although the best mode contemplated for carrying out the present invention has been herein shown and described, it will be apparent that modification and variation may be made without departing from what is regarded to be the subject matter of the invention.

What is claimed is:

1. A line-up vision system for use with automated machining apparatus to test for part alignment in said machining apparatus, said vision system comprising:

a light source mounted for illuminating a portion of said part to be aligned and for keeping another portion of said part relatively dark;

a camera mounted for viewing said part to be aligned, said camera viewing an edge between said illuminated area and said dark area, said camera providing a signal which indicates the position of said edge;

means for actuating said machining apparatus to enable said camera to observe the location of said edge as said machining apparatus moves said part; and means for comparing the position of said edge relative to a predetermined position as said part is moved.

2. A line-up vision system as defined in claim 1 including means for providing an error signal when the position of said part differs from said predetermined position by a predetermined amount as said apparatus moves said part.

3. A line-up vision system as defined in claim 1 including means for positioning said camera to observe said edge of said part.

4. A line-up vision system as defined in claim 1 including means for rotating said part as said camera observes the location of said edge.

5. A line-up vision system as defined in claim 1 including a backdrop positioned so said camera looks past said edge toward said backdrop, said backdrop providing a contrast with said edge to provide a sharply defined line between said part and said backdrop.

6. A line-up vision system as defined in claim 1 wherein said actuating means includes a programmable logic controller having a program for directing operation of said camera and for providing signals which cause said machining apparatus to be actuated, said controller being connected between said camera and said machining apparatus.

* * * * *